(12) United States Patent
Hirth (10) Patent No.: US 10,255,029 B2
(45) Date of Patent: Apr. 9, 2019

(54) INSTANT-ON ONE-BUTTON AURAL AMBIANCE MODIFICATION AND ENHANCEMENT

(71) Applicant: Yvette Seifert Hirth, San Francisco, CA (US)

(72) Inventor: Yvette Seifert Hirth, San Francisco, CA (US)

( * ) Notice: Subject to any disclaimer, the term of this patent is extended or adjusted under 35 U.S.C. 154(b) by 182 days.

(21) Appl. No.: 14/981,480

(22) Filed: Dec. 28, 2015

(65) Prior Publication Data

US 2017/0185370 A1  Jun. 29, 2017

(51) Int. Cl.
| | | |
|---|---|---|
| *H04R 1/20* | (2006.01) |
| *H04R 3/00* | (2006.01) |
| *G11B 7/00* | (2006.01) |
| *G06F 3/16* | (2006.01) |
| *H04R 1/32* | (2006.01) |
| *G10H 7/00* | (2006.01) |

(52) U.S. Cl.
CPC .............. *G06F 3/165* (2013.01); *G10H 7/00* (2013.01); *H04R 1/323* (2013.01); *G10H 2230/035* (2013.01); *G10H 2250/395* (2013.01); *H04R 2420/09* (2013.01)

(58) Field of Classification Search
CPC . H04R 1/00; H04R 1/02; H04R 1/025; H04R 1/20; H04R 1/323; H04R 1/2888; H04R 1/345; H04R 3/00; H04R 3/02; H04R 3/12; H04R 5/00; H04R 5/02; H04R 5/04; H04R 2420/09; H04R 2201/028; H04R 2201/029; H04R 2430/20; H04R 2227/005; H04R 2430/01; H04R 27/00; G06F 3/16; G06F 3/165; G10H 2230/035; G10H 2250/395

See application file for complete search history.

(56) References Cited

U.S. PATENT DOCUMENTS

| | | | | |
|---|---|---|---|---|
| 5,109,416 A * | 4/1992 | Croft | ........................ | H04R 5/02 381/1 |
| 5,586,187 A * | 12/1996 | Webb | ..................... | G10K 15/02 381/61 |
| 5,809,153 A * | 9/1998 | Aylward | .................. | H04R 1/20 381/160 |
| 9,425,747 B2 * | 8/2016 | Bazarjani | .............. | H03F 1/0211 |
| 2002/0068626 A1 * | 6/2002 | Takeda | ..................... | A63F 13/10 463/30 |
| 2003/0228881 A1 * | 12/2003 | Yamamoto | ............ | G06F 3/0338 455/550.1 |
| 2005/0021881 A1 * | 1/2005 | Asano | ................... | G06F 9/4413 710/19 |
| 2005/0221867 A1 * | 10/2005 | Zurek | ...................... | H04M 1/03 455/569.1 |
| 2006/0009290 A1 * | 1/2006 | Taho | ........................ | A63F 13/10 463/43 |
| 2007/0021145 A1 * | 1/2007 | Lam | .................. | H04M 1/72563 455/556.1 |
| 2007/0239461 A1 * | 10/2007 | Poninski | ............ | G11B 33/0488 704/500 |

(Continued)

*Primary Examiner* — Thang V Tran (74) *Attorney, Agent, or Firm* — Christopher Peil; Law Office of Christopher Peil (57) ABSTRACT

An instant-on nothing-to-download "soundscaping" device that provides natural, atonal sounds such as the rolling surf of the ocean, running streams, gurgling brooks, rain, thunder, wind, crowd sounds, et al is provided.

6 Claims, 10 Drawing Sheets

(56) References Cited

U.S. PATENT DOCUMENTS

| | | | |
|---|---|---|---|
| 2010/0027813 A1* | 2/2010 | Wu | H03F 3/2173 |
| | | | 381/120 |
| 2011/0023690 A1* | 2/2011 | Wilson | G10H 1/0058 |
| | | | 84/609 |
| 2016/0018868 A1* | 1/2016 | Shimada | G06F 1/324 |
| | | | 713/322 |
| 2017/0060524 A1* | 3/2017 | Daly | G06F 3/165 |

* cited by examiner

INSTANT-ON ONE-BUTTON AURAL AMBIANCE MODIFICATION AND ENHANCEMENT

BACKGROUND INFORMATION

Technical Field

The present device relates to an instant-on no-frills no-human-intervention-required sound generation device. More particularly, it relates to the concept of soundscaping which includes auto-playback of one or more preloaded sound files when powered on with endless looping of playback with a semi-permanently installed or permanently installed device.

Background Discussion

Playback devices are well-known in the art, from the Victrola record players of the late $19^{th}$ century through current art, such as music players, cell phones, and the like.

A brief look at the early record players will allow someone skilled in the art to see how playback devices evolved into the devices they are today. The first playback device was the well-known "phonograph" invented by Thomas Edison in 1877, for which he received a patent. His phonograph originally recorded sound onto a tinfoil sheet wrapped around a rotating cylinder, the sound emanating from a brass horn.

The first flat-surfaced playback device was proposed by Charles Cros at relatively the same time as Edison's and moved into manufacture in 1881, when a recording was cut into a wax disc and subsequently transferred to copper electrotype.

From there playback devices morphed into interchangeable sound file-based acoustic devices, such as the gramophone, which played vinyl discs, and was invented by Emile Berliner in 1887. The key feature was the interchangeability, which made possible rapid playback of multiple sound files.

With the introduction of electricity in the early $20^{th}$ century, discerning ears tired of the mechanical wind-up energy required in the early gramophones—which caused the record to play slower when the stored-up energy began to fade—and replaced the gramophone's mechanical wind-up motor with an elecric motor. As designs progressed, manufacturers chose to build jukeboxes that offered users the ability to choose pre-loaded record albums to listen to.

As technology progressed, recording sound on tape became available in the early 1930's when Western Electric and others initially began recording sound on movie film using photoelectric technology: a space was left on one side of the movie film and the sound level was transcribed in this space in an optical manner; i.e., the amplitude of the sound level the instant it was analyzed was written as a black line in a graph. Playback was achieved using an "early years" photocell that measured the length of the black lines going past and translated that into an output voltage, which was routed to speakers. This early record-sound-on-film effort was a functional equivalent of pulse code modulation, albeit using optical technology.

In the 1930's in Germany, engineers began recording sound on magnetic tape; after World War II, this technology—previously restricted by Germany—became available in the United States and allied nations. Sound was initially recorded in analog format on tape stored in spools; later this became cassettes, eight-track, and other tape formats.

Analog to Digital

In the early 1980's the advent of microchips running software instructions on the early IBM PC and Apple][ gave rise to digital sound manipulation. In the early days of digital sound, while Jobs and Wozniak were inventing the Apple][ they attached a speaker to a PWM output pin and instead of feeding the PWM Sound Values they fed the PWM the "address select" data from the Apple][ 's microchip. The chip used the current memory address of the Apple][ as the Sound Value and thus reproduced high-pitched sounds for high memory addresses and low-pitched sounds for low memory addresses. While they worked and their software ran on the Apple][ they listened to the tones generated by the addresses being used. It is a commonly-held belief that this is the first use of digital PWM to reproduce sound.

Digital sound reproduction efforts continued, and in the late 1980's the compact disc was invented and it proved a boon for the storage and playback of sound—thin, lightweight, not subject to erasure, compact discs provide users endless choices of long-term, permanent storage of high-quality sound. Compact disc "jukeboxes" are now common, and give users the ability to choose from hundreds of pre-loaded discs for playback.

The common denominator in this background art is that the playback devices in the prior art all offer choices and require loading of the sound source, and thus require setup. None appear to offer any method of instant-on playback of a pre-chosen pre-loaded sound source with the push of one button.

SUMMARY OF THE DEVICE

An instant-on nothing-to-download "soundscaping" device that provides natural sounds such as the rolling surf of the ocean, running streams, gurgling brooks, rain, thunder, wind, crowd sounds, et al is provided.

Primarily, the device provides instant-on sound generation, as opposed to starting a device such as a Personal Digital Assistant, then selecting a music application, then finding the sound file in the music application, then selecting the sound file to play.

Secondarily, the device overcomes limitations of currently-produced sound playback devices as all sound files being played back are pre-recorded and permanently installed in the device, thus there is no network nor host computer required for sound file sourcing, and the matters of purchasing sound tracks, dealing with their copyright issues, and licensing do not arise.

Thirdly, the device offloads the generation of natural sounds from other digital playback devices thus providing continuous sound generation even when digitally-equipped playback devices are being used for other things.

BRIEF DESCRIPTION OF THE DRAWINGS

Various other objects, features, and attendant advantages of the present device will become more fully appreciated as the same becomes better understood when considered in conjunction with the accompanying drawings, in which like reference characters designate the same or similar parts throughout the several views, and wherein.

DEFINITIONS

"ADC" shall be defined as any analog-to-digital converter, as that generally-accepted term is known in the industry.

"CPU" shall be defined as either a microprocessor, or a microcontroller, or a programmable logic controller, or as some combination of one or more of the above-listed components in a configuration that will run software program instructions.

"DAC" shall be defined as the industry-standard term that refers to any electronic circuit that functions as a digital-to-analog converter, regardless of how said circuit functions.

"Digital Converter Circuit" shall be defined as any electronic circuit, whether a PWM or a DAC or any other electronic circuit, whether a circuit that is a part of another device such as a processor ("built-in") or a circuit that is contained in a separate device ("outboard"), that converts digital data values to a pulse-width-modulated waveform or alternating voltage waveform that can be routed to a sound reproduction element (defined below) and listened to.

"Disk" shall be defined as the solid-state disk drive of any form factor, including microSD cards, SD cards, compact flash cards, solid-state disk drives et al, that is mounted on the printed circuit board and thus included within the device.

"EEPROM" shall be defined as any memory storage device that uses electronically erasable programmable read-only memory to store its contents after power has been removed.

"Flash" shall be defined as any memory storage device that uses flash memory to store its contents after power has been removed.

"Non-volatile memory" shall refer to any memory device that retains its contents after power has been removed, including but not limited to disk, Flash and EEPROM.

"PWM" shall be defined as the industry-standard term "pulse width modulation", a method of converting a fixed voltage into a variable voltage by causing the fixed incoming voltage to switch on and off many thousands of times a second with varying pulse width.

"Read from disk" shall be defined as the combination of software commands that initiate the read command to the disk and wait for it to complete.

"Read from EEPROM" shall be defined as the combination of software commands that initiate the read command to EEPROM and wait for it to complete.

"Sound Value" shall be defined as an 8-bit to 16-bit value that is obtained from the sound file.

"Sound file" shall be defined as any of the industry-standard sound file formats that are either non-encoded or encoded with a public-domain copyright; e.g., "way", "orb", etc.

"Sound reproduction element" shall be defined as either: a speaker; and a transducer; and any other electrical/electronic component that converts electrical energy into audible sound pressure waves; and as some combination of one or more of the above-listed components in a configuration that will convert electrical energy into audible sound pressure waves.

"Vendor" shall be defined as any manufacturer of CPU devices.

"Write to EEPROM" shall be defined as the combination of software commands that initiate the write command to EEPROM and wait for it to complete.

DETAILED DESCRIPTION

Instant-on One-Button Aural Ambiance Modification and Enhancement

An instant-on nothing-to-download "soundscaping" device that provides natural sounds such as the rolling surf of the ocean, running streams, gurgling brooks, rain, thunder, wind, crowd sounds, et al is provided. A detailed description of the device is provided herein.

In cooperation with the attached drawings, the technical contents and detailed description of the present device are described hereinafter according to a number of embodiments, but should not be used to limit its executing scope. Any equivalent variation and modification made according to appended claims is all covered by the claims of the present device.

Figure 1:
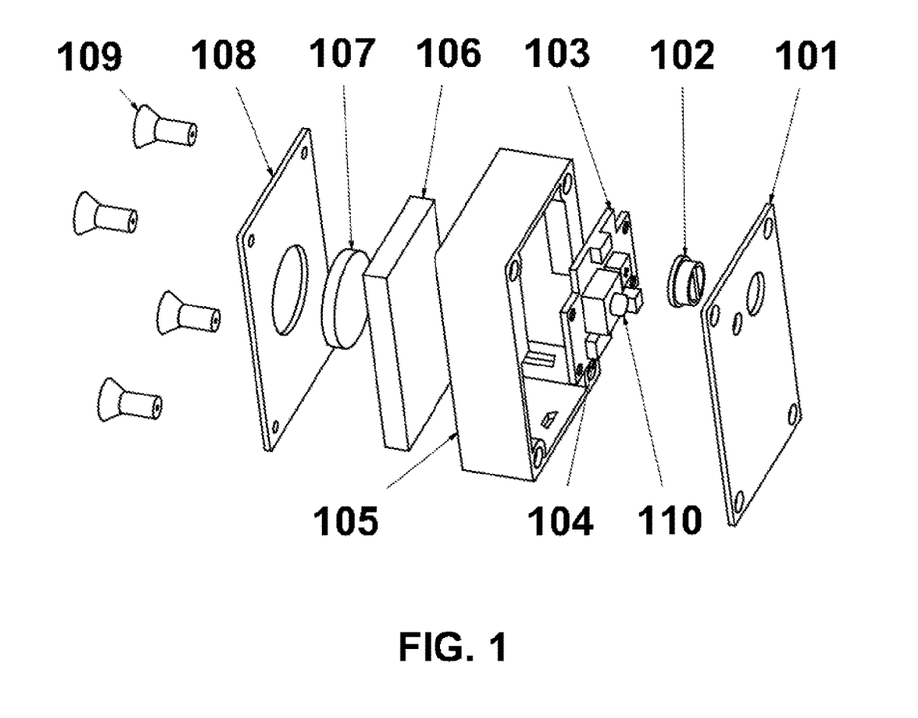
FIG. 1 shows an exploded view of an embodiment of the device that contains one sound reproduction element.

In FIG. 1, a soundscaping device is shown. The device is complete and self-contained and only needs a power source, such as the charged internal battery or a USB connection to function. The user presses the power-on button 110 and adjusts the volume control 102 and sound emanates from the sound reproduction element 107. In embodiments, the device contains one or more pre-recorded sound files that contain atonal "natural" sounds; e.g., running water, wind, bird sounds, etc., as oppposed to music.

Figure 5:
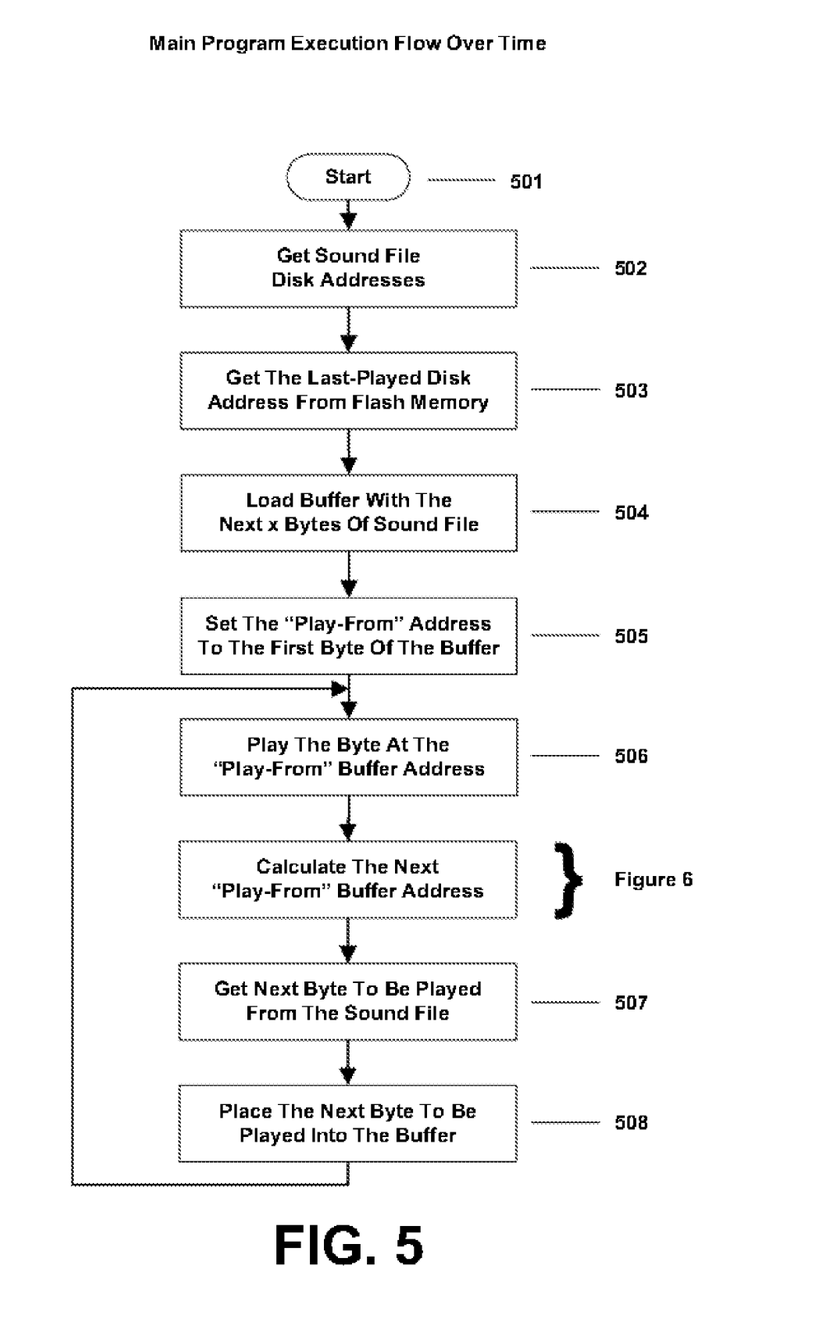
FIG. 5 shows the top level block functions in the program code that runs on the CPU on the printed circuit board for embodiments of the device that contain one sound file.
Figure 6:
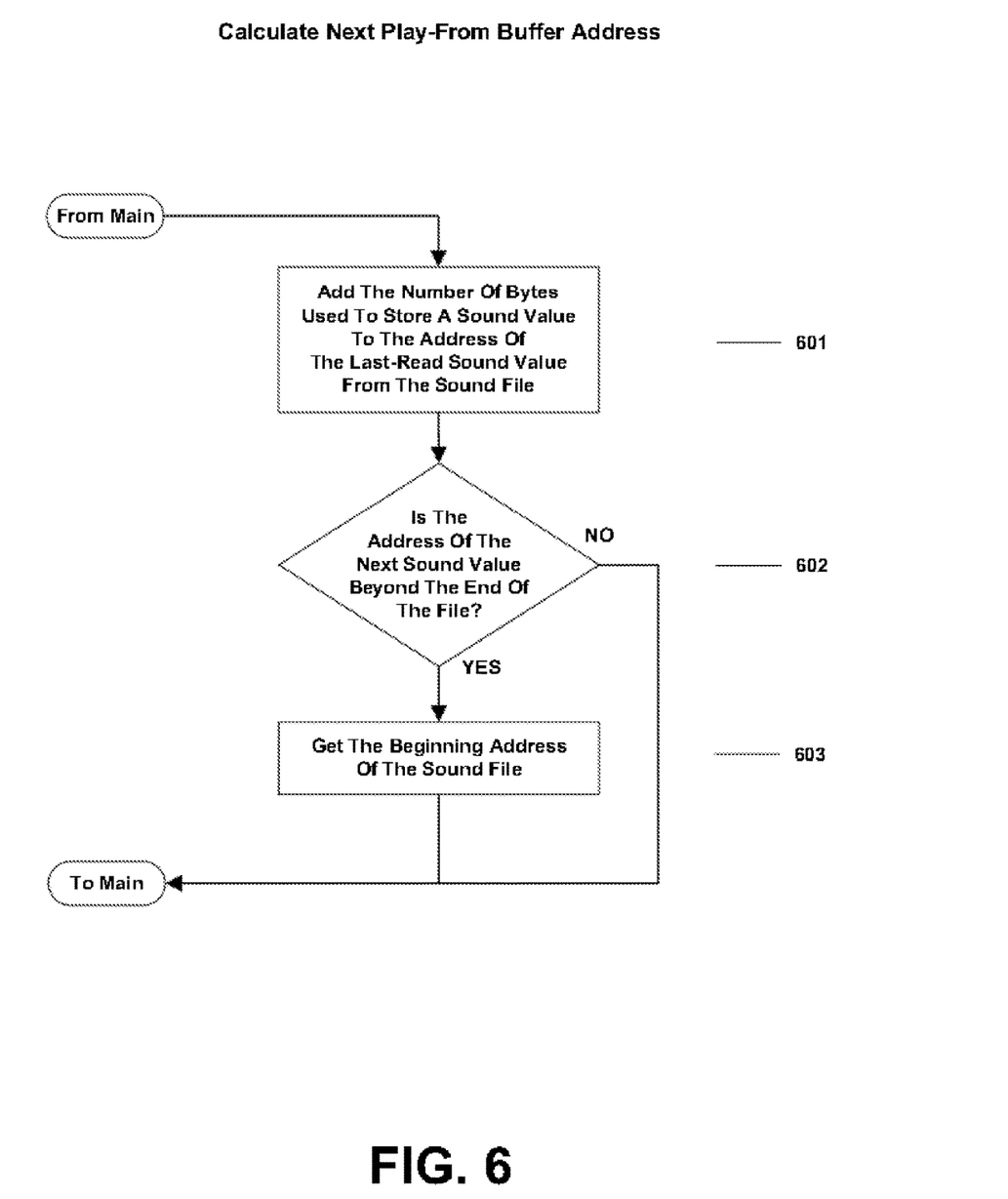
FIG. 6 shows the detailed functionality of the program code that runs on the CPU that determines the address of the next Sound Value in a sound file to be played.
Figure 7:
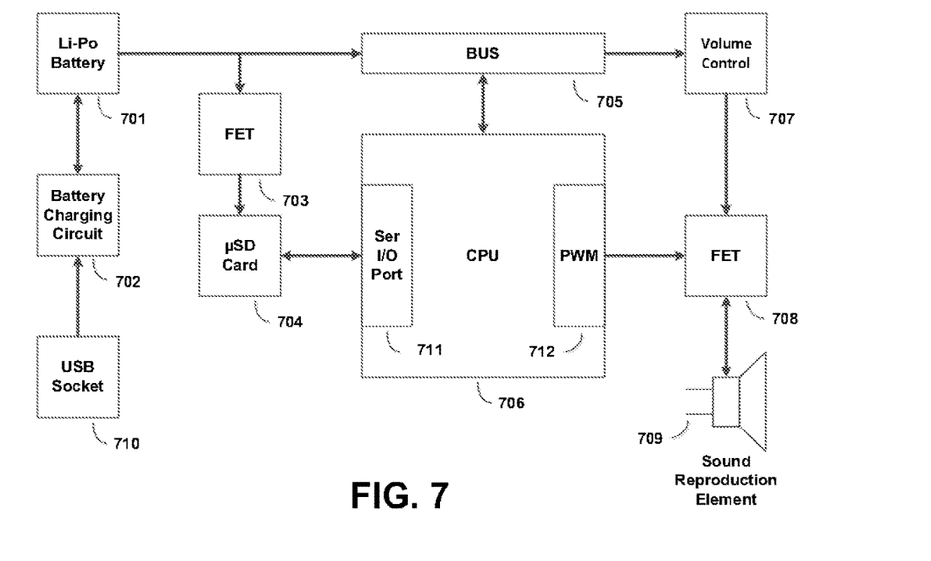
FIG. 7 is a functional block diagram of the printed circuit board for embodiments of the device that contain one sound file.

Playback of natural sounds is initiated after the power-on button 110 on the front cover 101 which is affixed to the electronics printed circuit board 103 is pressed causing power to flow from the internal rechargeable battery 105 to the circuit board 103 which causes the CPU to begin its self-test process and after this process completes, which usually takes less than a millisecond, the CPU begins executing the software program (the "program") stored in non-volatile memory as further outlined below and in FIGS. 5, 6 and 7.

As the program instructions "endlessly loop" the sound file, first the program determines the starting address of the disk sound file then obtains by reading from disk the Sound Value located at the starting address of the sound file then the program determines the ending address of the sound file then obtains by reading from EEPROM the disk address of the last-played Sound Value in the sound file which is set when: (a) the device is manufactured, in which case the code is preset during manufacture to the address of the first Sound Value in the sound file; and (b) during the program code processing as further defined below. This last-played Sound Value address is incremented using a program function (subroutine) that increments the disk address and resets it to the starting disk address if the incremented disk address is a larger value than the ending disk address, thus supporting the endlessly looping feature. The program function that contains the logic just detailed is further detailed in FIG. 6.

After the above steps are completed the program code execution enters an infinite loop whose function is detailed herein. Once the Sound Value from the sound file has been obtained either initially as outlined above or iteratively as outlined herein the program code moves the Sound Value to the Digital Converter Circuit device for reproduction as further detailed below in FIGS. 5 and 6.

In the case of pulse-width modulation (PWM), the output pulse width specified by the value of the Sound Value is calculated as follows:

railVoltage*(Sound Value/PWM_range)

where:
  railVoltage=the maximum voltage from the power supply rail;
  Sound Value=the Sound Value just moved to the PWM; and
  PWM_range=the maximum value ("bit depth") that can be used in the PWM The PWM generates a variable-width voltage output from the Sound Value for a "time slice" (period) of 1/22,050 second in the case of sound files that have been sampled at 22.050 kHz or for a period of 1/44,100 second in the case of sound files that have been sampled at 44.1 kHz. If the Sound Value obtained has a sign bit, the sign bit should be removed, as the PWM can recreate only positive voltage pulses and may interpret the sign bit as a data bit value. Further, as each time slice can have a different Sound Value, each time slice can thus have a differing pulse width output of railVoltage, which approxixmates an alternating current waveform, albeit one-sided (varying positive voltage values only). The output waveform more closely resembles single-sideband (SSB) waveforms, which are comprised of either the positive half or the negative half of alternating current waveforms.

In the case of DACs, the output voltage specified by the value of the Sound Value is calculated as follows:

railVoltage*(Sound Value/DAC_range)

where:
  railVoltag=the maximum voltages from the power supply rail;
  Sound Value=the Sound Value just moved to the DAC; and
  DAC_range=the maximum value ("bit depth") that can be used in the DAC The DAC generates a positive or negative variable-voltage output from the Sound Value for a "time slice" (period) of 1/22,050 second in the case of sound files that have been sampled at 22.050 kHz or for a period of 1/44,100 second in the case of sound files that have been sampled at 44.1 kHz. The Sound Value fed into the DAC should not have the sign bit removed, as the DAC can recreate positive and negative voltage pulses. As each time slice can have a different Sound Value, each time slice can thus have a differing pulse voltage, whether positive or negative, which recreates an alternating current waveform.

Regardless of the equipment used, the resultant sounds emanating from the single sound reproduction element form an omnidirectional pattern.

Figure 2:
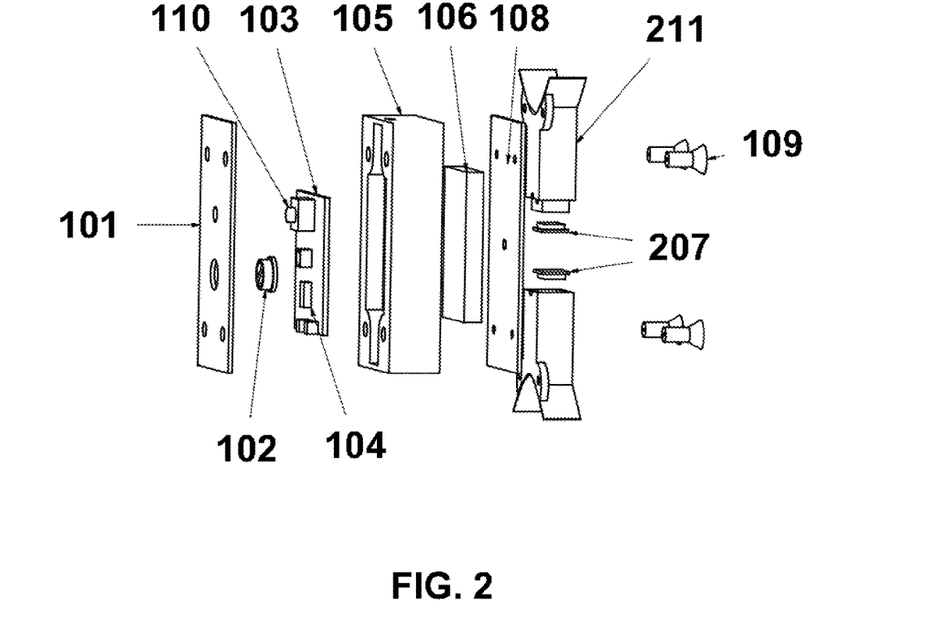
FIG. 2 shows an exploded view of an embodiment of the device that contains two sound reproduction elements.

In FIG. 2 an embodiment of the device routes sound playback to two sound reproduction elements 207 that are wired out-of-phase which due to the laws of physics with respect to out-of-phase wave interference patterns creates two "null sound" zones which are perpendicular to the axis of sound reproduction as further detailed in FIG. 5, below. In order to project these null sound zones, the two sound reproduction elements feed their sound into exponential horns 211, which project the resultant sound along an axis. People located in the two "null sound" zones can then experience a degree of conversational/verbal/aural privacy even if the surrounding sound level is loud.

In embodiments, the device can contain multiple sound files and multiple volume controls in which case the device simultaneously reads the next Sound Value to be played from each sound file and mixes them according to the volume settings chosen by the user before moving the mixed Sound Value to the Digital Converter Circuit for playback as further detailed below in FIGS. 9 and 6.

Figure 3:
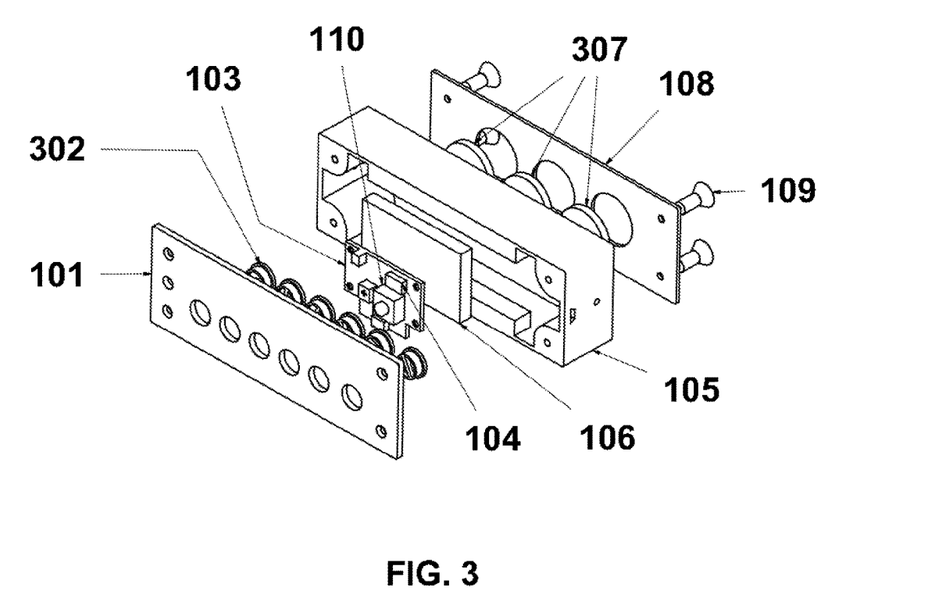
FIG. 3 shows an exploded view of an embodiment of the device that contains three sound reproduction elements.

In FIG. 3 multiple sound files are being played back at the same time and the microprocessor 104 blends the Sound Values obtained from each sound file based upon the volume control 302 settings for each sound before routing it to the three in-phase sound reproduction elements 307 which reproduce the sound in an omnidirectional pattern.

Figure 4:
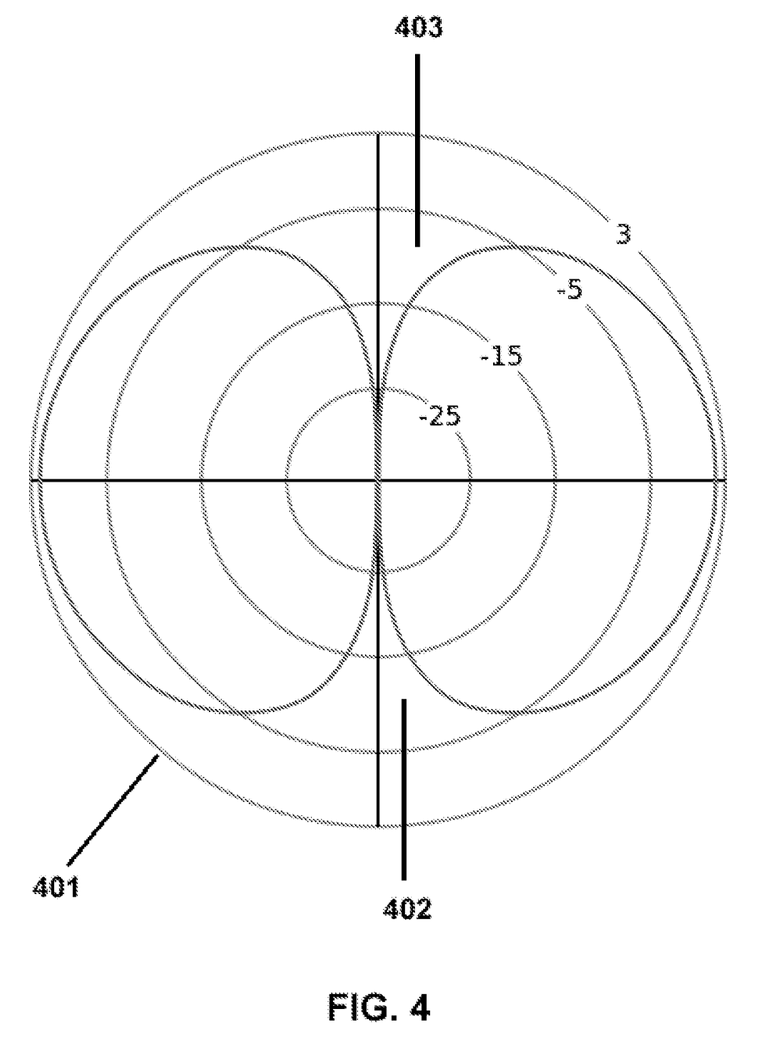
FIG. 4 shows a standard dipole radiation pattern and sound reproduction pattern that occurs when the two sound reproduction elements are 180 degrees out-of-phase.

FIG. 4 illustrates a dipole sound radiation pattern generated by embodiments of the device with two sound reproducing elements that are mounted so as to project sound from either side of an axis between them 401 but are wired so as to be 180 degrees out of phase which then behave according to the laws of physics of out-of-phase dipole radiation patterns as shown with the resulting sound reproduction creating two null zones (areas lacking sound) 402 403 that partially or fully permit conversation between both the user and anyone directly in front of the user even though the surrounding sound level is loud.

Note that the dipole sound radiation pattern shown in FIG. 4 relies on acoustically reflective physical items, such as walls, windows and doors, to not abut the listeners location. If acoustically reflective items abut the listeners position, sound reflected from these acoustically reflective items will reduce the size and "quietness" of the null zones. For cases where the device will be placed, mounted or installed in an area where there is an acoustically reflective item nearby, embodiments may contain two volume controls 2 contained in the device, one per sound reproduction element. Adjusting the volume control that controls the sound emanating from the sound reproduction element closer to the acoustically reflective items will help to diminish overly-loud sounds "bouncing off" the acoustically reflective items nearby. In this manner, embodiments of the device with two volume controls may be used more effectively near acoustically relfective items by helping to fine-tune the output volume of the sound reproduction element near the acoustically reflective items and thus fine-tune the null zones that are created.

In FIG. 5 the processing logic from the instant of power-on through the instant of power-down or battery failure for embodiments having one sound file is shown. The user only needs to press the power-on button and processing begins. After power-on 501, the CPU startup processing obtains the starting and ending addresses 502 from non-volatile memory for the sound file that is about to be played, then retrieves from non-volatile memory the address of the last-played Sound Value from the sound file 503 from any prior execution, and using that address reads the next Sound Value to be played from the sound file into a buffer 504. After at least the next Sound Value to be played has been retrieved, the CPU startup processing then sets the address of the Sound Value retrieved from the sound file 505 for the execution loop, below.

The program code then begins an infinite execution loop when the program code starts a 21.050 kHz or 42.100 kHz timer interrupt to limit the amount of time per Sound Value played. The exact value of the frequency of the timer interrupt must match the sampling rate that was used when the sound file was recorded to ensure accurate playback. The 21.050 kHz and 42.100 kHz sampling rates are typical industry-standard sampling rates, but any rate can be used, subject to the processor:non-volatile storage access timing considerations explained herein.

The program code begins the loop by moving the Sound Value retrieved in 504 to the Digital Converter Circuit so that it can begin generating an output pulse, the data contents of the Sound Value in effect limiting the pulse width. The program code then calculates the address of the next Sound Value to be retrieved from the Sound Value file that is playing as further outlined in FIG. 6 below then gets the next Sound Value to be played from the sound file being played 507 then moves the next Sound Value to be played into the buffer 508 then waits for the timer to elapse and the timer interrupt to restart this process, thus forming an execution loop from the beginning of its definition as outlined above.

The key requirement for the CPU is that it is able to complete a read from disk in the amount of time of each 21.050 kHz or 42.100 kHz time slice. A 21.050 kHz time slice provides 47.6 microseconds in which to complete the read from disk; a 42.100 kHz time slice provides 23.8 microseconds in which to complete the read from disk. There are many different CPU vendors and many different CPU models with varying performance characteristics and these are quite temporal as CPU vendors are in a constant state of product development where they are creating new CPUs that are faster and use less power, so specifying a CPU vendor or model would be pointless as in any event the specifications would be out-of-date and thus useless in the definitions herein. The needs of the CPU are the ability to satisfy the code functionality as described above within the 23.8 or 47.6 microsecond periods explained above, or the sound reproduction will suffer.

In FIG. 6 the portion of program code referred above to as a functional routine is detailed. The function program code begins by adding the size, in bytes, of the Sound Value to the input (last Sound Value read) address 601. The function program code then compares the result of the addition to the ending address of the relevant sound file 602. In all but the end of file edge case, the resultant value will not be greater, and is thus usable. In the end of file edge case 603, the function program code moves the beginning address of the sound file to the result, thus providing the "endlessly looping" functionality. The function program code then returns to the invoker/caller.

In FIG. 7 the block-level functionality of the components on the printed circuit board 103 as shown in FIGS. 1 and 2 is detailed. The battery charging circuit 702 charges the battery 701 via an industry-standard micro USB configured detachable charging cable that is connected to the USB socket 710. Once the battery has sufficient charge it feeds both the system bus 705 and the field effect transistor 703 that powers the drivers on the disk 704. The system bus powers the CPU 706 and the serial peripheral interface sub-component 711 and the PWM sub-component 712 of the CPU 706 and the field effect transistor 708 whose gate voltage is varied according to the volume control 707 thus limiting the output voltage of the PWM to the sound reproduction element 709.

In embodiments, the PWM sub-component 712 of the CPU 706 is replaced by an outboard DAC. The function of the of the components is equivalent, with the limitations as previously outlined in the dicussion of FIG. 1.

Figure 8:
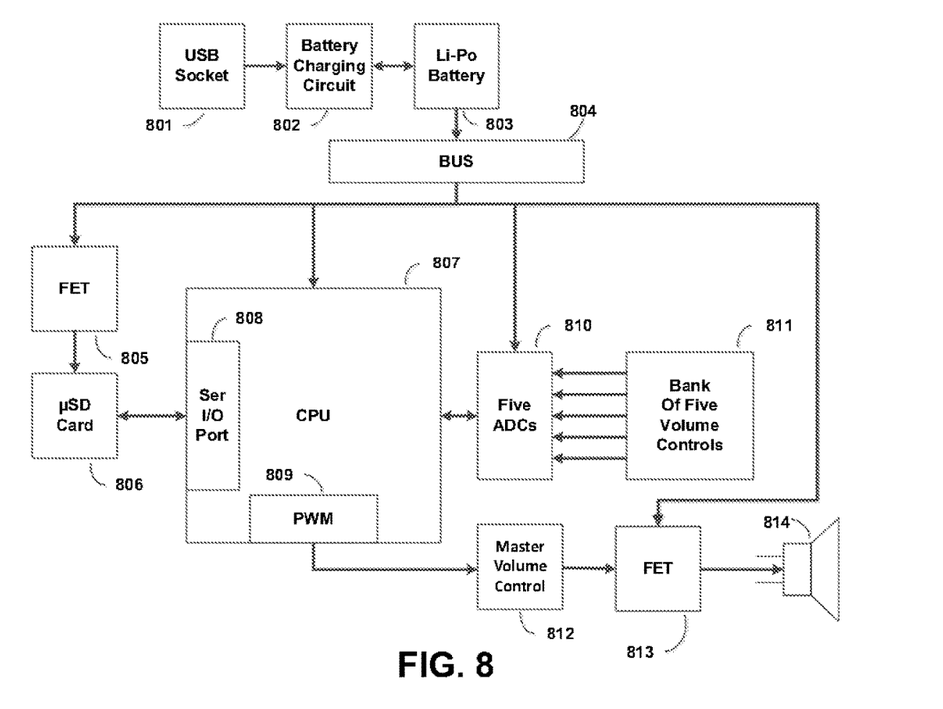
FIG. 8 is a functional block diagram of the printed circuit board for embodiments of the device that contain multiple sound files.

In FIG. 8 the block-level functionality of the components on the printed circuit board 103 as shown in FIG. 3 is detailed. The battery charging circuit 802 charges the battery 803 via an industry-standard micro USB socket 801. Once the battery has sufficient charge it feeds both the system bus 804 and the field effect transistor 805 that powers the drivers on the disk 806. The system bus powers the CPU 807 and the serial peripheral interface sub-component 808 and the PWM sub-component 809 of the CPU 807 and the array of multiple ADC's 810 which convert the volume control settings 811 into digital values and the field effect transistor 813 that powers the three sound reproduction elements 809. There is one volume control 811 for each sound being reproduced. The program code reads the settings of the individual volume controls 811 as fed to it by the ADC's 810 to determine how to mix the resultant sound. The gate voltage of the field effect transistor 813 is varied according to the master volume control 812 thus limiting the output voltage of the Digital Converter Circuit to the three sound reproduction elements 809.

The mixing of the multiple Sound Values can be accomplished by any number of methods, each of which may have it's own embodiment. The mixing technique preferred creates no additional harmonic distortion but requires an adjustment of the master volume control 812. Specifically, using the preferred mixing technique, as volume increases in one or more sounds being mixed the master volume control must be lowered or an overall increase in volume may result. This is an expected outcome of the following mixing process:

$$\text{Mixed Sound Value} = (vol1 + vol2 \ldots voln)/n$$

where:
  vol1 is the Sound Value value of source 1 times the setting for volume control 1
  vol2 is the Sound Value value of source 2 times the setting for volume control 2
  voln is the Sound Value value of source n times the setting for volume control n
  n is the number of input sources The value of the each volume control's setting is expressed as a decimal percentage of the maximum; e.g., if the bit depth of the ADC for the volume control is 10, the maximum value (volume control turned fully clockwise) is $2^{10}$, which is 1024. Thus a volume control setting of 512 means one-half (512/1024=0.500), 256 means one-quarter (256/1024=0.250), etc.

The Sound Values can vary between 0 and max, where "max" is the highest number that can be stored by the sampling technique used. If the sampling technique is 16-bit, then $2^{16}$=65,536, and the Sound Values can vary between 0 and 65,536.

The Sound Values, when added together, can exceed the maximum bit depth of the recording, which will create clipping. Clipping, in digital signal processing circuits, is when the maximum voltage exceeds that which can be reproduced. If the five input Sound Values have values of, for example, 59224, 55736, 58918, 61003, and 59965, then they sum to 294846. 294846 is far higher than the 65,536 maximum value of a 16-bit DAC, so the device scales the sum by averaging it over the number of input sources (in this example, 5) using integer math which rounds down to arrive at the value (in this example) of 58969, which is within the 65,536 limit and thus avoids clipping.

Regardless of the precision of the ADC's and the sampled sound file, the mixed result is scaled to match the Data Converter Circuit:

Output Sound Value=(Mixed Sound Value/encoding_
bit_depth max value)*Data Converter Circuit
max value Thus if an embodiment has a 16-bit sampled sound file, the encoding_bit_depth max value of the input is 65535 (65535 is 2^16), and if the embodiment has a 10-bit Data Converter Circuit, the max value that the Output Sound Value may have is 1024 (1024 is 2^10), and if the resultant Mixed Sound Value is the 60 k value as shown above, we get:

Output Sound Value=(60000/65536)*1024=937 (integer math, rounded down)

Mixing techniques known in the art include no-scaling, which replicates the above process but does not scale the vol1+vol2 . . . +voln algorithm, and A+B−AB. No-scaling is fine for samples that have large digital headroom; i.e., samples that never come close to the max value of the sampling technique, however, the signal-to-noise ratio in such samples can be low, and summing them without scaling them raises the noise level. A+B−AB may work fine on some audio samples but introduces a ring-modulation type of distortion that can create spurious transient output values which have little relationship to the input Sound Value and thus are undesirable.

Figure 9:
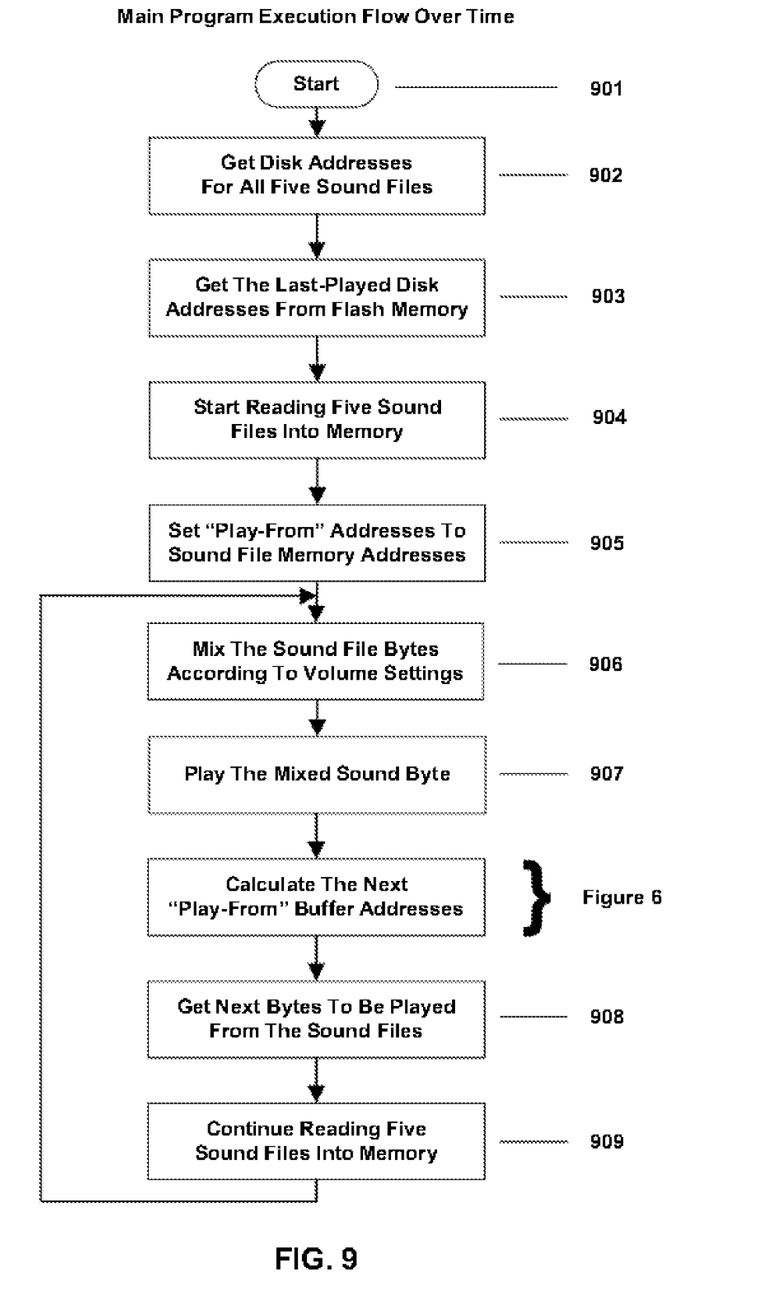
FIG. 9 shows the top level block functions in the program code that runs on the CPU on the printed circuit board for embodiments of the device that contain multiple sound files.

In FIG. 9 the processing logic from the instant of power-on through the instant of power-down or battery failure for embodiments having multiple sound files is shown. The user only needs to press the power-on button and processing begins. After power-on 901, the CPU startup processing obtains the starting and ending addresses 902 from permanent memory for each sound file that will be played, then retrieves from non-volatile memory the address of the last-played Sound Value for each sound file 903 from any prior execution and using those addresses reads the next Sound Value to be played for each of the sound files into a buffer 904. After at least the next Sound Value for each sound file being played has been retrieved, the CPU startup processing then sets the address of the Sound Values retrieved from their relative sound files 905 for the execution loop, below.

The program code then begins an infinite execution loop when the program code starts a 21 kHz or 42 kHz timer interrupt to limit the amount of time per Sound Value played. The program code begins the loop by moving the Sound Values retrieved in 904 to a mixing Sound Value, each Sound Value retrieved in 904 is added to the mixing Sound Value in a weighted manner based upon their relative volume control settings 906 and as described above. When the Sound Values retrieved in 904 are all moved to the mixed Sound Value the mixed Sound Value is moved to the Digital Converter Circuit 907 so that it can begin generating an output pulse, the data contents of the Mixed Sound Value in effect limiting the pulse width. The program code then increments the address of each Sound Value in each file that is playing as further outlined in FIG. 6 then gets the next Sound Value to be played for each sound file that is being played 908 then moves the next Sound Value to be played into the buffer 904 then waits for the timer to elapse and the timer interrupt to restart this process, thus forming an execution loop from the beginning of its definition as outlined above.

Figure 10:
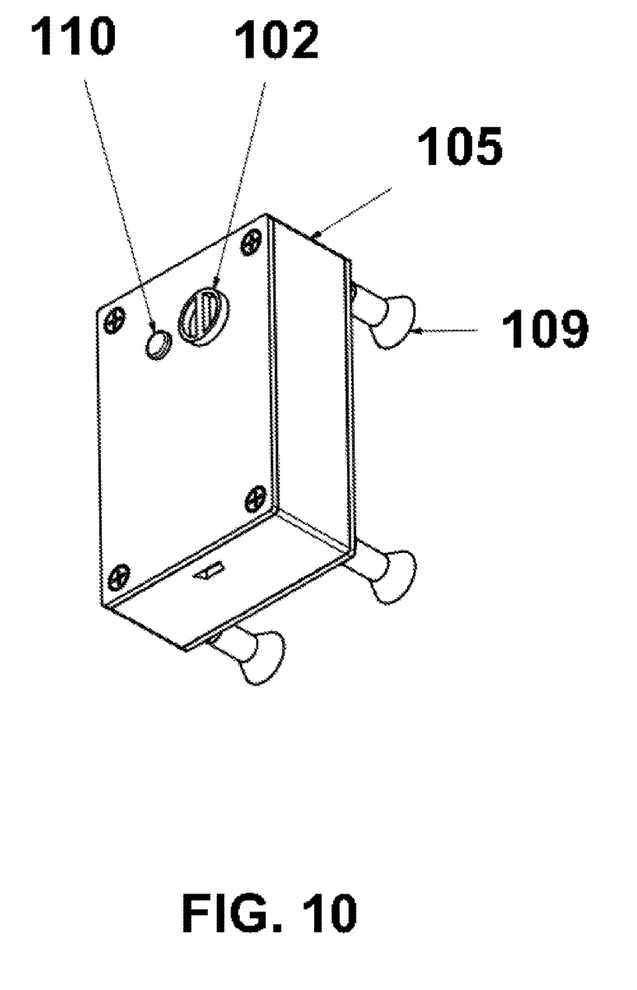
FIG. 10 depicts one possible assembled embodiment equipped with a single sound reproduction element.

FIG. 10 is a drawing of an assembled embodiment of the device. The power switch 110, volume control 102, case 105 and feet 109 are shown.

While the foregoing written description enables one of ordinary skill to make and use a device as described, those of ordinary skill will understand and appreciate the existence of variations, combinations, and equivalents of the specific embodiments, methods, and examples herein. The specification described here should therefore not be limited by the above described embodiments, methods, and examples, but by all embodiments and methods within the scope and spirit of the claims.

The invention claimed is:

1. A sound playback device, comprising:
 a playback circuit, including:
  a processor;
  a permanent storage medium;
  at least one sound file permanently stored on said permanent storage medium at device manufacture;
  program instructions, which when executed on said processor, playback the contents of said at least one sound file instantly responsive to a user initiating power to the sound playback device;
 a power supply for the playback circuit; and
 at least one sound reproduction element for emitting sound produced responsive to playback of said at least one sound file;
 wherein said program instructions, when executed on said processor, responsive to said at least one sound file being played, cause two of said at least one sound reproduction element wired one hundred and eighty degrees out-of-phase with each other to emit sound in a dipole pattern having two null zones, the two null zones being perpendicular to an axis common to the two sound reproduction elements.

2. A sound playback device, comprising:
 a playback circuit, including:
  a processor;
  a permanent storage medium;
  at least one sound file permanently stored on said permanent storage medium at device manufacture;
  program instructions, which when executed on said processor, playback the contents of said at least one sound file instantly responsive to a user initiating power to the sound playback device;
 a power supply for the playback circuit; and
 at least one sound reproduction element for emitting sound produced responsive to playback of said at least one sound file;
 wherein multiple sound files of said at least one sound file are mixed together by said processor into one resultant reproducible sound, the resultant reproducible sound being emitted by three of said at least one sound reproduction element wired in-phase with each other, thereby creating an omnidirectional sound pattern.

3. The sound playback device of claim 1 or 2, further comprising a switch for said power supply for controlling power to said device.

4. The sound playback device of claims 1 or 2, further comprising a plurality of feet.

5. The sound playback device of claim 1 or 2, further comprising a PWM (pulse width modulation) circuit that reads at least one sound value from said at least one sound file and varies an output sound waveform pulse width according to the at least one sound value.

6. The sound playback device of claim 1 or 2, further comprising a DAC (digital-to-analog converter) circuit that reads at least one sound value from said at least one sound file and varies an output sound waveform pulse width according to the at least one sound value.

* * * * *